Patented Sept. 22, 1953

2,653,173

UNITED STATES PATENT OFFICE 2,653,173

CHLOROPENTENYL ETHERS

Warren D. Niederhauser, Philadelphia, Pa., assignor to Rohm & Haas Company, Philadelphia, Pa., a corporation of Delaware No Drawing. Application January 28, 1950,
Serial No. 141,165

3 Claims. (Cl. 260—614)

This invention relates to chloropentenyl ethers having the formulas $$ClCH_2CH=CHCH_2CH_2-O-CH_2CH_2CH=CHCH_2Cl$$

and $$CH_2=CHCHClCH_2CH_2-O-CH_2CH_2CHClCH=CH_2$$

These new compounds which are also properly identified as 5-chloro-3-pentenyl ether and 3-chloro-4-pentenyl ether are prepared simultaneously as a mixture of isomers by the reaction of one mole of sym.-chloromethyl ether, $$(ClCH_2)_2O$$

with two moles of 1,3-butadiene. The reaction takes the following course $$(CH_2Cl)_2O + 2CH_2=CH-CH=CH_2$$
$$\downarrow$$
$$ClCH_2CH=CHCH_2CH_2-O-CH_2CH_2CH=CHCH_2Cl$$

and $$CH_2=CHCHClCH_2CH_2-O-CH_2CH_2CHClCH=CH_2$$

While both compounds are formed, the first is ordinarily produced in a predominant amount. It has also been found that when various mixtures of the two compounds are treated with a catalytic amount of zinc chloride the two compounds form an equilibrium mixture containing about 85% of 5-chloro-3-pentenyl ether and about 15% 3-chloro-4-pentenyl ether.

In the preparation of these new ethers, the reactants combine quite readily at temperatures from 0° C. to about 50° C., although the preferred temperatures are from about 10° C. to about 30° C. Superatmospheric pressures are not necessary but can be used if desired and pressures up to about 100 pounds per square inch are satisfactory. The presence of a catalyst is helpful and mild Friedel-Crafts type catalysts such as zinc chloride, mercuric chloride, ferric chloride, bismuth chloride, antimony chloride and the like are recommended. Although the butadiene and the chloromethyl ether react in the ratio of two molar equivalent weights of the former to one of the latter, it is apparent that an excess of either can be employed. Actually it is preferred to employ a slight excess of butadiene which facilitates the reaction and can be recovered from the reaction mixture. The use of a solvent is recommended and for this purpose glacial acetic acid is particularly satisfactory.

The two isomeric products which are formed simultaneously can be separated by fractional distillation but for many purposes this is not necessary. For example, the mixture of isomeric chlorinated ethers on reacting with an inorganic cyanide appears to yield only one dinitrile, presumably due to allylic rearrangement. This dinitrile is then readily hydrolyzed to a dicarboxylic acid which is very useful for the manufacture of alkyd resins. Alternatively, the original mixture can be reacted with an aqueous solution of an alkali carbonate to produce a mixture of the isomeric glycols which react with polycarboxylic acids, including those described immediately above, to form linear polyesters or alkyd resins. Or the mixture of the isomeric products of this invention can be converted readily into a mixture of isomeric diamines which react with dicarboxylic acids, including those described above, to form linear polyamides. Thus the compounds of this invention serve as a source of dicarboxylic acids and glycols and diamines which are the chief materials used in the formation of polyesters and polyamides.

The following example serves to illustrate the preferred method of preparing the products of this invention.

*Example*

A flask, equipped with thermometer, agitator, reflux condenser, dropping funnel and inlet tube, was charged with a solution of 58.4 grams of zinc chloride in 315 grams of glacial acetic acid. This solution was stirred and to it was added 345 grams of chloromethyl ether, $(ClCH_2)_2O$, over a period of 2.5 hours. During the addition of the ether, 486 grams of butadiene was passed into the solution and the temperature was maintained at 5°–15° C. by external cooling. The resultant mixture was then held at 15°–25° C. for 3.5 hours after which it was thoroughly washed, first with water, then with a 5% aqueous solution of sodium hydroxide and finally with water again. The product was then dried under reduced pressure at 90° C. The residue, weighing 651 grams, was then fractionally distilled in the presence of 1% lead salicylate as a stabilizer. The fraction boiling at 100°–165° C. at 3 mm. of pressure (Hg) represented a 65% yield of the mixed isomeric chloropentenyl ethers. This was redistilled through a Vigreux column at 110°–140° C. and a pressure of 3 mm. and the purified product was analyzed. Analysis showed that the product contained 54.16% carbon, 7.48% hydrogen and 30.7% chlorine as against a calculated value for $C_{10}H_{16}OCl_2$ of 53.86% carbon, 7.23% hydrogen, and 31.8% chlorine. The observed molecular weight was 224 as compared with the calculated value of 223.

I claim:
1. As a new composition of matter a mixture of the isomeric chloropentenyl ethers having the formulas

ClCH$_2$CH=CHCH$_2$CH$_2$OCH$_2$CH$_2$CH=CHCH$_2$Cl and

CH$_2$=CHCHClCH$_2$CH$_2$OCH$_2$CH$_2$CHClCH=CH$_2$

2. A process for preparing a mixture of the isomeric chloropentenyl ethers having the formulas ClCH$_2$CH=CHCH$_2$CH$_2$—O—CH$_2$CH$_2$CH=CHCH$_2$Cl and CH$_2$=CHCHClCH$_2$CH$_2$—O—CH$_2$CH$_2$CHClCH=CH$_2$ which comprises reacting, at a temperature from 0° C. to 50° C. and in the presence of a Friedel-Crafts catalyst, butadiene and sym.-chloromethyl ether, the reactants being present in the ratio of at least two moles of said butadiene to one mole of said sym.-chloromethyl ether.

3. A process for preparing a mixture of the isomeric chloropentenyl ethers having the formulas ClCH$_2$CH=CHCH$_2$CH$_2$—O—CH$_2$CH$_2$CH=CHCH$_2$Cl and CH$_2$=CHCHClCH$_2$CH$_2$—O—CH$_2$CH$_2$CHClCH=CH$_2$ which comprises reacting, at a temperature from 10° C. to 30° C. and in the presence of a Friedel-Crafts catalyst, butadiene and sym.-chloromethyl ether, the reactants being present in the ratio of at least two moles of said butadiene to one mole of said sym.-chloromethyl ether.

WARREN D. NIEDERHAUSER.

References Cited in the file of this patent

UNITED STATES PATENTS

| Number | Name | Date |
|---|---|---|
| 2,024,749 | Scott | Dec. 17, 1935 |
| 2,075,312 | Straus | Mar. 30, 1937 |